Patented Mar. 2, 1954

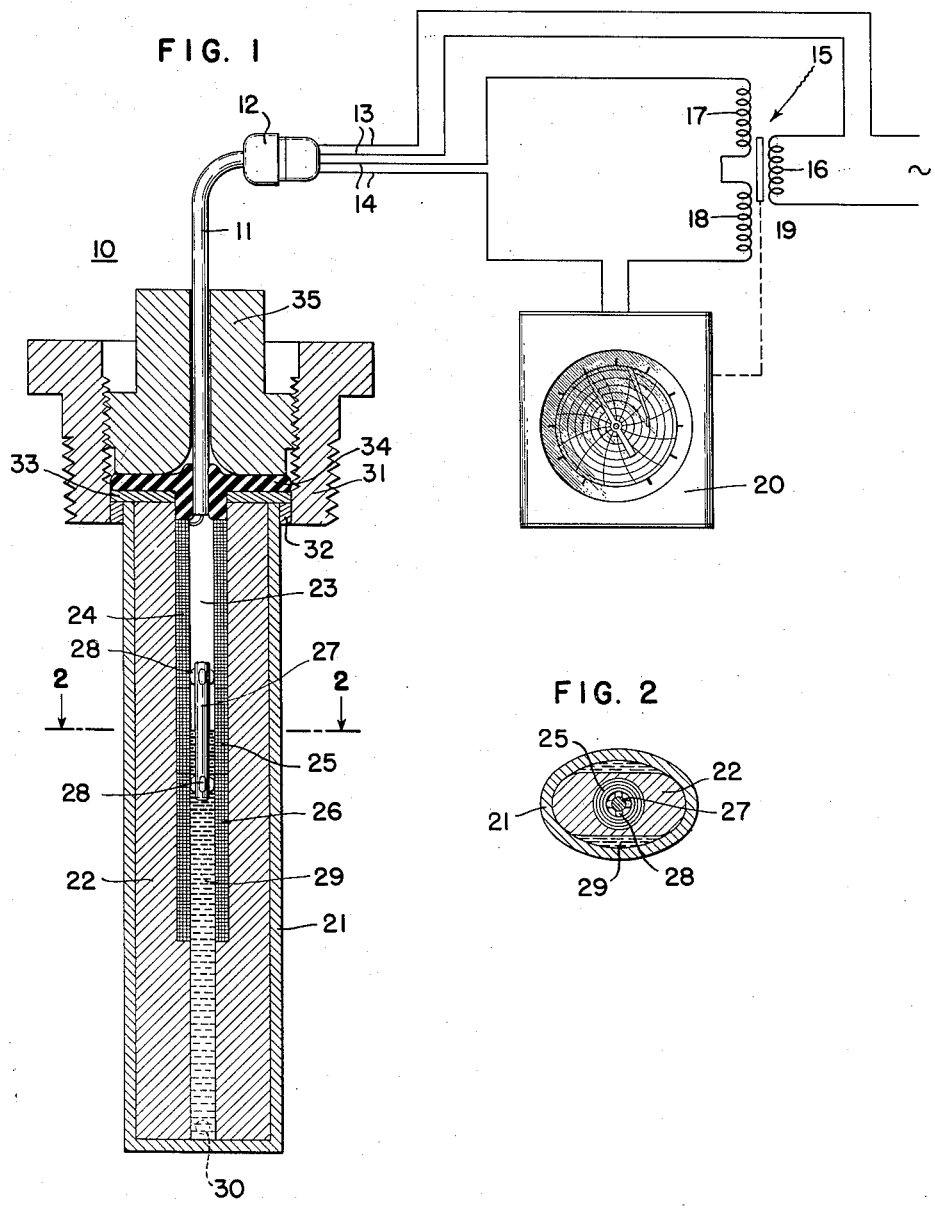

2,671,203

UNITED STATES PATENT OFFICE 2,671,203

ELECTRICAL MEASURING APPARATUS

James J. Griffin, Philadelphia, Pa., assignor to Minneapolis-Honeywell Regulator Company, Minneapolis, Minn., a corporation of Delaware Application December 11, 1952, Serial No. 325,343

7 Claims. (Cl. 336—30)

A general object of the present invention is to provide a new and improved pressure to electric transducer of the electromagnetic type. More specifically, the present invention concerns a pressure to electric transducer wherein a relatively dense liquid is caused to rise and fall in position by a volume change in a chamber and that liquid displaces a core member relative to an electrical circuit to change a characteristic thereof.

In present day pressure measuring problems, it is frequently necessary to provide a pressure measuring apparatus which will withstand extremely high pressure and yet produce accurate results. Such apparatus must be universal in its application, rugged, easily manufactured, and capable of ready integration into standard measuring circuitry. It has been found that a relatively small movement of a metallic core relative to an electrical inductive circuit can be used to produce a relatively large change in the electrical characteristics of the circuit. It is this arrangement which has been incorporated in the present apparatus with the arrangement completely enclosed in a pressure responsive collapsible chamber to provide a new and improved pressure to electric transducer.

It is, accordingly, a further object of the present invention to provide an improved pressure to electric transducer enhanced by its ruggedness, reliability and response.

A still further object of the present invention is to provide a new and improved pressure to electric transducer wherein an electrical coil assembly has a core movable relative thereto in accordance with the state of collapse of a chamber which completely surrounds the assembly.

Another object is to provide a new and improved pressure to electric transducer wherein a plurality of electrical coils are positioned within a collapsible chamber with the state of collapse of the chamber determining the height of a liquid in the chamber with the liquid displacing a core member relative to the coils.

Still another object of the present invention is to provide with the foregoing objects a pressure to electric transducer which is temperature compensated.

The various features of novelty which characterize the invention are pointed out with particularity in the claims annexed to and forming a part of this specification. For a better understanding of the invention, however, its advantages, and specific objects attained with its use, reference should be had to the accompanying drawings and description matter in which there is illustrated and described preferred embodiments of the invention.

Of the drawings, Fig. 1 is a cross sectional view of the present apparatus and the manner in which the apparatus may be associated with appropriate electrical indicating apparatus; and Fig. 2 shows a cross sectional view of the apparatus of Fig. 1 taken along the section lines 2—2.

Referring now to the drawings, the numeral 10 represents the pressure to electric transducer of the present apparatus. This transducer is shown having an output cable 11 which connects to a suitable connector plug 12. The connector plug is arranged so that a pair of leads 13 supply power to the transducer and a further pair of leads 14 are the output leads which are connected to a suitable rebalancing transformer 15. The transformer 15 comprises a primary 16 connected in series with the leads 13 to a source of power and a pair of secondaries 17 and 18 which are connected in opposition. A core 19 is arranged to be adjustable relative to the primary and the secondaries to vary the electrical coupling therebetween. For detecting the electrical balance conditions between the output of the transducer 10 on the leads 14 and the output of the transformer 15 on the secondaries 17 and 18 is a suitable indicating and recording apparatus 20. The apparatus 20 has an output which may be used to position the core 19 relative to the windings of the transformer 15. A suitable indicating and recording apparatus may be that which is shown in the patent to Walter P. Wills, 2,423,540, issued July 8, 1947. Said Wills apparatus is of the type which will respond to the electrical unbalance condition on the input and produce an output operation which will rebalance the electrical input error signal as well as give an indication of the variable which is causing the unbalance condition on the input.

Referring now more specifically to the transducer 10, the transducer will be seen to comprise an elongated hollow tube 21. This tube 21 is preferably of an elliptical cross section so as to enhance its ability to partially collapse without destruction when exposed to an external pressure. The cross sectional view shown in Fig. 2 shows one form that the cross section of the tube may assume. It is to be understood, however, that other cross sections of the tube 21 may be utilized so long as the cross section is readily adapted to partially collapse when exposed to a high pressure and yet sufficiently rugged so as to withstand the compressing forces of a high pressure.

The tube 21 is sealed at the lower end in any desired manner.

Positioned within the tube 21 is a protective and temperature compensating element 22. This element is preferably made of a material which has substantially zero coefficient of expansion. One such material which is satisfactory is a metal known commercially as Invar. It will be noted in Fig. 2 that the element 22 is bearing against the ends of the tube 21 and this configuration is used to provide protection for the tube 21 when it is exposed to a high pressure. As shown in this type of arrangement, when the tube 21 is exposed to a high pressure, the sides of the tube 21 will collapse against the sides of the protective element 22 so as to prevent the stressing of the metal of the tube 21 beyond its elastic limit. Details of the present form of the protective element and tube as well as other configurations which are suitable will be found in a copending application of Philip J. Donald, entitled "Measuring Apparatus," Serial No. 315,003, filed October 16, 1952.

Positioned within the central hole 23, extending the length of the element 22, are a plurality of coils 24, 25, and 26. These coils are preferably arranged so that the coil 25 is energized by the input lines 13 and acts as a primary in the electrical circuit with the coils 24 and 26 being the secondary windings and being connected, as windings 17 and 18, in series opposition. For varying the electrical coupling between the primary 25 and the secondaries 24 and 26 there is provided a movable core 27 which is preferably of a magnetic material which will vary the coupling effect between the primary 25 and the secondaries 24 and 26. This core 27 has a plurality of centering projections 28 extending around the periphery of the core so as to maintain the same centered in its position in the coils.

The core 27 is arranged to float or be buoyed up by a relatively dense liquid 29 which may be, for example, mercury. As long as the input frequency to the coil 25 is relatively low, the electrical effect of the mercury upon the circuit will be negligible. The apparatus in its more conventional form may be used with a 60 cycle power supply.

A hole 30 in the lower portion of the element 22 is provided to permit the passage of the liquid 29 from the center hole 23 to the outside of the element 22 between the element and the tube 21, as shown in Fig. 2.

The upper end of the tube 21 is fastened to a connecting plug 31 which is threaded on the inside as well as on the outside with the outside threads being selected for engaging a suitable threaded portion of a chamber where the pressure is to be measured by the apparatus. The tube 21 is fastened to the plug 31 by a filler element 32 which may be welded in position between the plug 31 and the tube 21.

The protective element and temperature compensating element 22 may be suspended from a suitable washer 33 which rests over the top of the tube 21 as well as the filler element 32. Sealing the enclosure at the top is a resilient member 34 in the form of a washer having a central hole permitting the passage of the cable 11. This washer is arranged for compression into position by a plug 35 which threadedly engages the inner threads of the mounting plug 31.

In considering the operation of the present apparatus, it will be assumed that during the process of assembly that the height of the liquid 29 is selected so that the core 28 will be centered in its position relative to the primary coil 25 and the secondary coils 24 and 26. While this is not essential, a gain in sensitivity is obtained by having the central point of operation of the apparatus being about the center position. When the apparatus is mounted in an enclosure where the pressure is to be measured, the pressure will act upon the walls of the tube 21 and cause the same to partially collapse with a resulting decrease in the internal volume of the tube. This volume change will be reflected in a change in the height of the liquid 29. With the liquid level height changed, the core 28 will be moved relative to the primary and the two secondaries 24 and 26 so as to change the electrical coupling between the coils. As shown, the core 27 will move in an upward direction so as to increase the coupling between the primary winding 25 and the secondary 24 and to decrease the coupling between the winding 25 and the secondary 26. This change in the coupling will result in a greater output voltage of the secondary winding 24. This will result in an unbalance signal in the input of the instrument 20 and this instrument will be operative to reposition the core 19 until a balance condition is reached on the input of the instrument.

Should the pressure decrease, the operation will be in the opposite direction from that just assumed.

While the apparatus may have only the liquid 29 therein, it is possible to have an additional liquid on the outside of the element 22 between the tube 21 and the element 22 so that this liquid will fill all space outside of the hole 23. This second liquid must of necessity be of less density than the liquid 29 and when less dense, the head of the liquid 29 will support a higher head of the liquid outside of the hole 23. This insures that all volume changes in the tube 21 will be reflected in the movement of the core 27. The same effect may be gained by filling the hole 23 above the liquid 29 with a gas under pressure with the pressure being sufficient to move the mercury or liquid 29 to all space outside of the element 22.

In order that temperature compensation be effected, the element 22 is arranged to substantially fill all space within the tube 21 so as to minimize the amount of liquid 29 within the tube. As a relatively dense liquid, such as mercury, has a relatively high temperature coefficient of expansion, it is essential that the volume thereof be limited to such an extent that the volume increase in the tube 21 with temperature increase will be substantially the same as a volume increase in the liquid 29. By constructing the protective element 22 of a material having substantially zero temperature coefficient of expansion, it is possible to obtain excellent temperature compensation with the present arrangement.

While in accordance with the previsions of the statutes, there has been illustrated and described the best forms of embodiment of the invention known, it will be apparent to those skilled in the art that changes may be made in the forms of the apparatus without departing from the spirit of the invention as set forth in the appended claims, and that in some cases certain features of the invention may be used to advantage without a corresponding use of other features.

Having now described the invention, what I claim as new and desire to secure by Letters Patent is as follows:

1. A pressure to electric transducer comprising, an elongated elliptical hollow tube sealed at the ends and arranged for partial collapsing upon exposure to an external pressure, a plurality of electrical coils disposed within said tube, a relatively dense liquid filling a portion of said tube, and a metallic core less dense than said liquid carried by said liquid and positioned relative to said electrical coils so that movement thereof relative to said coils will produce a change in an electrical characteristic of said coils.

2. A pressure sensing element comprising, an electrical transformer having a plurality of elongated hollow windings, a core of magnetic material displaceable in the hollow portion of said windings to vary the electrical coupling between said windings, an elongated hollow elliptical tube sealed about and completely enclosing said transformer and arranged to decrease in internal volume when exposed to an external pressure, and a liquid supporting said core filling a portion of said tube and moving said core relative to said windings upon changes in volume of said tube.

3. In a pressure to electric transducer, the combination comprising, an elongated hollow elliptical tube sealed at both ends and arranged to have a pressure applied externally thereof, an elongated metallic protecting member bearing against the ends of said tube and providing on its sides a rigid surface onto which the sides of said tube may collapse when exposed to a high pressure, a cylindrical bore extending through a portion of said member, a hollow electrical coil positioned within said bore, a liquid filling a portion of said tube, and a magnetic member floating on said liquid in said electrical coil to vary an electrical characteristic thereof as said liquid rises and falls with pressure changes on said tube.

4. In a pressure to electric transducer, the combination comprising, an elongated hollow elliptical tube sealed at both ends and arranged to have a pressure applied externally thereof, an elongated metallic protecting member bearing against the ends of said tube and providing on its sides a rigid surface onto which the sides of said tube may partially collapse when exposed to a high pressure, a cylindrical bore extending through a portion of said member, a plurality of hollow electrical coils positioned within said bore, a liquid filling a portion of said tube, and a magnetic member floating on said liquid and arranged to vary the coupling between said coils as said liquid rises and falls with volume changes in said tube.

5. A pressure to electric transducer comprising, an elongated elliptical hollow tube arranged for partial collapsing upon exposure to an external pressure, a plurality of electrical coils sealed within said tube, and mercury filling a portion of said tube and floating a metallic core structure in the electrical field of said coils, said mercury causing said core structure to rise and fall with volume changes of said tube.

6. A pressure to electric transducer comprising, an elongated elliptical hollow tube arranged for partial collapsing upon exposure to an external pressure, a plurality of electrical coils sealed within said tube, a relatively dense liquid filling a portion of said tube and floating a metallic core structure in the electrical field of said coils, and a temperature compensating element positioned within said tube, said element having a substantially zero temperature coefficient of expansion.

7. In a pressure to electric transducer, the combination comprising, an elongated hollow elliptical tube sealed at both ends and arranged to have a pressure applied externally thereof, an elongated metallic protecting member bearing against the ends of said tube and providing on its sides a surface onto which the sides of said tube may collapse when exposed to a high pressure, said member being formed of a material having a low temperature coefficient of expansion, a plurality of hollow electrical coils positioned within said member, a liquid filling a portion of said tube, and a metallic member floating on said liquid, said member rising and falling with changes in volume of said tube.

JAMES J. GRIFFIN.

References Cited in the file of this patent

UNITED STATES PATENTS

| Number | Name | Date |
| --- | --- | --- |
| 2,243,188 | Biach | May 27, 1941 |
| 2,430,757 | Conrad et al. | Nov. 11, 1947 |